United States Patent
Wilson et al.

(10) Patent No.: US 10,392,932 B2
(45) Date of Patent: Aug. 27, 2019

(54) THROUGH-CASING FIBER OPTIC ELECTRICAL SYSTEM FOR FORMATION MONITORING

(71) Applicant: Halliburton Energy Services, Inc., Houston, TX (US)

(72) Inventors: Glenn Andrew Wilson, Singapore (SG); Ahmed Elsayed Fouda, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 156 days.

(21) Appl. No.: 15/531,624

(22) PCT Filed: Dec. 30, 2014

(86) PCT No.: PCT/US2014/072760
§ 371 (c)(1),
(2) Date: May 30, 2017

(87) PCT Pub. No.: WO2016/108845
PCT Pub. Date: Jul. 7, 2016

(65) Prior Publication Data
US 2017/0321544 A1  Nov. 9, 2017

(51) Int. Cl.
*E21B 49/00* (2006.01)
*E21B 43/20* (2006.01)
(Continued)

(52) U.S. Cl.
CPC ............. *E21B 49/00* (2013.01); *E21B 43/20* (2013.01); *E21B 47/123* (2013.01); *G01V 3/20* (2013.01); *E21B 33/12* (2013.01)

(58) Field of Classification Search
CPC ........ E21B 49/00; E21B 43/20; E21B 47/123; E21B 33/12; G01V 3/20; G01V 8/20; G01V 8/24; G01V 3/34
See application file for complete search history.

(56) References Cited

U.S. PATENT DOCUMENTS

| 6,393,363 | B1 | 5/2002 | Wilt et al. |
| 6,534,986 | B2 | 3/2003 | Nichols |

(Continued)

FOREIGN PATENT DOCUMENTS

| WO | 2015/130298 | 9/2015 |
| WO | 2015/160347 | 10/2015 |

(Continued)

OTHER PUBLICATIONS

International Search Report and Written Opinion for PCT Patent Application No. PCT/US2014/072844, dated Sep. 25, 2015; 18 pages.

(Continued)

*Primary Examiner* — Wei Wang
(74) *Attorney, Agent, or Firm* — Baker Botts L.L.P.

(57) ABSTRACT

A through-casing formation monitoring system may include a casing string positioned within a wellbore, a power source electrically coupled to the casing string, a voltage sensor electrically coupled to an inner surface of the casing string such that the voltage sensor allows a continued operation of the wellbore, a fiber optic cable coupled to an electro-optical transducer within the voltage sensor, and an optical interrogation system configured to measure an electric potential applied to the electro-optical transducer via the fiber optic cable.

24 Claims, 5 Drawing Sheets

(51) Int. Cl.
*E21B 47/12* (2012.01)
*G01V 3/20* (2006.01)
*E21B 33/12* (2006.01)

(56) References Cited

U.S. PATENT DOCUMENTS

| | | |
|---|---|---|
| 6,541,975 B2 | 4/2003 | Strack |
| 8,332,191 B2 | 12/2012 | Rosthal et al. |
| 8,400,159 B2 | 3/2013 | Gao |
| 8,614,578 B2 | 12/2013 | Gao et al. |
| 8,812,237 B2 | 8/2014 | Wilt et al. |
| 9,091,785 B2 | 7/2015 | Donderici et al. |
| 2003/0226662 A1 | 12/2003 | Linyaev et al. |
| 2005/0046589 A1 | 3/2005 | Wisler et al. |
| 2006/0272809 A1 | 12/2006 | Tubel et al. |
| 2007/0256830 A1 | 11/2007 | Entov et al. |
| 2008/0018334 A1 | 1/2008 | Reiderman |
| 2009/0091328 A1 | 4/2009 | Clark et al. |
| 2009/0150124 A1 | 6/2009 | Wilt et al. |
| 2010/0271030 A1 | 10/2010 | Reiderman et al. |
| 2011/0139447 A1 | 6/2011 | Ramos et al. |
| 2011/0198078 A1 | 8/2011 | Harrigan et al. |
| 2013/0056197 A1 | 3/2013 | Maida et al. |
| 2014/0013554 A1 | 1/2014 | Hojaji |
| 2014/0191120 A1 | 7/2014 | Donderici et al. |
| 2014/0222343 A1 | 8/2014 | Samson et al. |

FOREIGN PATENT DOCUMENTS

| | | |
|---|---|---|
| WO | 2016/108845 | 7/2016 |
| WO | 2016/108861 | 7/2016 |
| WO | 2017/105467 | 6/2017 |

OTHER PUBLICATIONS

International Preliminary Report on Patentability for PCT Patent Application No. PCT/US2014/072844, dated Jul. 13, 2017; 14 pages.

Kaufman, Alexander A. "The electrical field in a borehole with a casing." Geophysics 55.1 (1990): 29-38; 10 pages.

Schenkel, Clifford J., and H. Frank Morrison. "Electrical resistivity measurement through metal casing." Geophysics 59.7 (1994): 1072-1082; 11 pages.

Wilt, M. J., et al. "Crosswell electromagnetic tomography: System design considerations and field results." Geophysics 60.3 (1995): 871-885; 15 pages.

Alumbaugh, David L., and H. F. Morrison. "Monitoring subsurface changes over time with cross-well electromagnetic tomography." Geophysical Prospecting 43.7 (1995): 873-902; 30 pages.

Singer, Bension Sh, and Kurt-M. Strack. "New aspects of through-casing resistivity theory." Geophysics 63.1 (1998): 52-63; 12 pages.

Starcher, Mark, et al. "Next Generation Waterflood Surveillance: Behind Casing Resistivity Measurement Successfully Applied in the 'A3-A6' Waterflood at Elk Hills Field, Kern County, California." SPE Western Regional/AAPG Pacific Section Joint Meeting. Society of Petroleum Engineers, 2002; 8 pages.

Marsala, Alberto Francesco, et al. "Crosswell electromagnetic tomography: From resistivity mapping to interwell fluid distribution." International Petroleum Technology Conference. International Petroleum Technology Conference, 2008; 6 pages.

Pardo, David, Carlos Torres-Verdín, and Maciej Paszynski. "Simulations of 3D DC borehole resistivity measurements with a goal-oriented hp finite-element method. Part II: through-casing resistivity instruments." Computational Geosciences12.1 (2008): 83-89; 7 pages.

V.E. Tsoy, N.I. Rykhlinsky, et al. "Method of Nano-Electrical Logging in Cased Wells for Evaluation of Unrecovered Oil Reserves and Determination of Oil Saturation Factor of Rocks." Methodological Maintenance of Scientific Research, 2009; 11 pages.

International Search Report and Written Opinion for PCT Patent Application No. PCT/US2014/072760, dated Sep. 9, 2015; 16 pages.

International Preliminary Report on Patentability for PCT Patent Application No. PCT/US2014/072760, dated Jul. 13, 2017; 13 pages.

THROUGH-CASING FIBER OPTIC ELECTRICAL SYSTEM FOR FORMATION MONITORING

RELATED APPLICATIONS

This application is a U.S. National Stage Application of International Application No. PCT/US2014/072760 filed Dec. 30, 2014, which designates the United States, and which is incorporated herein by reference in its entirety.

TECHNICAL FIELD

The present disclosure relates generally to hydrocarbon recovery operations and, more particularly, to a system and method for formation monitoring with voltage sensors.

BACKGROUND

Hydrocarbons, such as oil and gas, and water may be produced from subterranean reservoir formations located onshore or offshore. The processes involved in recovering hydrocarbons from a reservoir are becoming increasingly complex. Production may involve a number of different steps such as drilling a wellbore at a desired well site, optimizing placement of the wellbore within the reservoir, treating the wellbore to optimize production of hydrocarbons, and performing the necessary steps to produce, process and transport the hydrocarbons from the reservoir.

When performing subterranean operations, it may be desirable to monitor changes in the formation and fluids located near the wellbore. For example, fluid saturations of a formation may change over time, and water produced from the wellbore may affect the economics of the well.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

The present disclosure describes a through-casing electromagnetic (EM) formation monitoring system and method for long-term monitoring of the formation surrounding a wellbore from within a casing string. The formation monitoring system includes one or more voltage sensors located inside the casing string of a wellbore. The sensors measure voltage or other electrical properties along various points of the casing string and communicate those measurements to an optical interrogation system that determines formation properties (e.g., resistivity and fluid saturations of the formation) based on the measurements. Locating the electrical formation monitoring system inside the casing string allows the system to be deployed into existing cased wellbores such that the formation monitoring system may be deployed in mature fields. Additionally, maintenance costs of the formation monitoring system may be reduced because the equipment is accessible and/or removable from the interior of the casing string. Further, deploying a formation monitoring system consistent with this disclosure does not interfere with the operation of the well so continuous formation monitoring is possible, even while the well continues to operate. A system and method may be designed in accordance with the teachings of the present disclosure to deploy a low-cost, long-term EM formation monitoring system within the casing string of a wellbore. Embodiments of the present disclosure and its advantages are best understood by referring to FIGS. 1 through 5, where like numbers are used to indicate like and corresponding parts.

Figure 1:
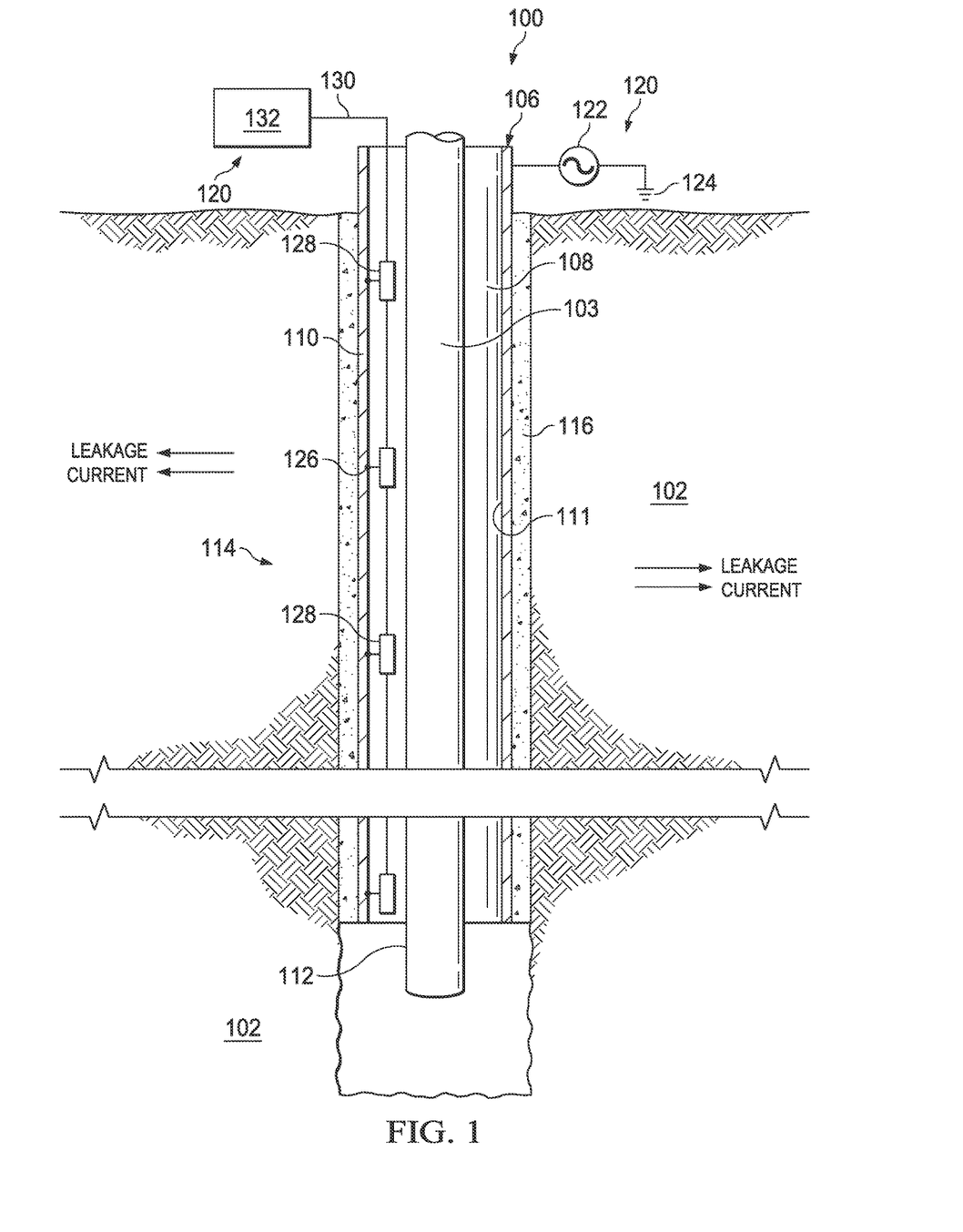
FIG. 1 illustrates an elevation view of an example embodiment of a subterranean operations system used in an illustrative wellbore environment.

FIG. 1 illustrates an elevation view of an example embodiment of a subterranean operations system used in an illustrative wellbore environment. Well system 100 may include well surface or well site 106. Various types of equipment such as a drilling rig, rotary table, drilling fluid or production fluid pumps, drilling fluid tanks (not expressly shown), and other drilling or production equipment may be located at well surface or well site 106. Although well system 100 is illustrated as a land based system, production operations incorporating teachings of the present disclosure may be satisfactorily used with offshore production systems located on offshore platforms, drill ships, semi-submersibles, and drilling barges (not expressly shown).

Well system 100 may include wellbore 114 that is defined in part by casing string 110 extending from well surface or well site 106 to a selected downhole location. The annular space between casing string 110 and wellbore 114 may be filled with cement 116 to hold casing string 110 in place. Well system 100 may also include production tubing 103, which may be used to produce oil, gas, and water from formation 102 via wellbore 114. The fluids may be directed to flow through production tubing 103. Annulus 108 may be defined by outside surface 112 of production tubing 103 and inside surface 111 of casing string 110.

As shown in FIG. 1, wellbore 114 may be substantially vertical (e.g., substantially perpendicular to well surface or well site 106). However, wellbore 114 may also be substantially horizontal (e.g., substantially parallel to well surface or well site 106) or at a desired angle or angles relative to vertical. Additionally, wellbore 114 may include one or more lateral wellbores formed at an angle from wellbore 114. The terms "uphole" and "downhole" may be used to describe the location of various components relative to the bottom or end of wellbore 114 shown in FIG. 1. For example, a first component described as uphole from a second component may be further away from the end of wellbore 114 than the second component. Similarly, a first component described as being downhole from a second component may be located closer to the end of wellbore 114 than the second component.

Formation monitoring system 120 may include power source 122 electrically coupled between casing string 110 and remote earth counter electrode 124 such that power source 122 may inject a current into casing string 110. Power source 122 may be an electrical supply grid, generator, battery, fuel cell, solar cell, and/or other suitable device configured to harvest energy. In some embodiments, the power consumption and electrical interfaces of power source 122 may be defined by appropriate oilfield power and safety standards, such as the Intelligent Well Interface Standardisation (IWIS) standard. The connection between power source 122 and casing string 110 may be made at any location along the casing string 110 (e.g., uphole at well surface or well site 106, or downhole). Casing string 110 may be an electrically conductive material, including but not limited to, steel or a steel alloy like carbon steel or stainless steel.

Formation monitoring system 120 may also include one or more voltage sensors 128 that measure the voltage or other electrical properties associated with formation 102 surrounding wellbore 114 at various points along casing string 110 and communicate these measurements to optical interrogation system 132 via fiber optic cable 130. Voltage sensor 128 may be coupled to fiber optic cable 130 and placed in electrical contact with inner surface 111 of casing string 110 along various points. Voltage sensor 128 may include an electro-optical transducer coupled to electrode 126, which provides an electrical contact with inner surface 111 of casing string 110. In some embodiments, the electro-optical transducer of voltage sensor 128 may be made of an electrostrictive material, including but not limited to lithium niobate, ferroelectric, or lead zirconium titanate, so that its shape changes in response to the application of an electric potential to voltage sensor 128. The electro-optical transducer may be designed so that its impedance is high enough (e.g., approximately one megohm (MΩ)) to create approximately a one-to-one ratio between the electric potential at electrode 126 and the electric potential applied to the electro-optical transducer, regardless of impedances existing at electrode 126 and/or formation 102. The change in shape of the electro-optical transducer may affect light on fiber optic cable 130 such that optical interrogation system 132 may determine the amount of electric potential applied to voltage sensor 128. In other embodiments, the electro-optical transducer of voltage sensor 128 may be a light emitting diode (LED) that converts electrical potential into light on fiber optic cable 130, whose intensity may vary proportionally to the electric potential applied to voltage sensor 128. Electrode 126 may be made of an electrically conductive material, such as silver, copper, gold, aluminum, nickel, zinc, or brass, and may be shaped to maximize contact areas with inner surface 111 of casing string 110. Electrode 126 may electrically couple voltage sensor 128 to casing string 110.

To ensure the continued functioning and accuracy of the formation monitoring system 120, voltage sensor 128 and/or fiber optic cable 130 may be outfitted with special protection. For example, voltage sensor 128 may be placed in a durable housing (not expressly shown) to protect the sensor during deployment into casing string 110. Also, fiber optic cable 130 may be part of a protective tubing encapsulated cable (TEC). The durable housing and TEC may also protect voltage sensor 128 and fiber optic cable 130 from the harsh conditions that exist in wellbore 114. The housing containing voltage sensor 128 may be made from electrically non-conductive, high strength material such as carbon fiber, fiber glass, or ceramic, and may be rated to resist abrasion, crushing, or any other type of mechanical failure.

Voltage sensor 128 may further include a global positioning system (GPS) unit that provides time-synchronization. Information from the GPS unit within voltage sensor 128 may also be communicated by electrical and/or optical methods to optical interrogation system 132 for further processing of the acquired information. In some embodiments, the GPS unit and voltage sensor 128 may be separate elements of formation monitoring system 120.

Formation monitoring system 120 may further include optical interrogation system 132 that gathers information about formation 102 through voltage sensors 128 located along casing string 110. Optical interrogation system 132 may be configured to communicate with voltage sensors 128 via fiber optic cable 130 or via individual fibers within fiber optic cable 130. Optical interrogation system 132 may communicate with individual voltage sensors 128 on fiber optic cable 130 through the use of time, wavelength, and/or frequency multiplexing. In some embodiments, fiber optic cable 130 may utilize a multi-mode optical fiber to increase the information transmission capacity over the cable. Accordingly, optical interrogation system 132 may communicate with individual voltage sensors 128 sequentially or in parallel. In some embodiments, data stacking, averaging, and other processing techniques may be applied to signals on fiber optic cable 130 to compensate for signal noise and/or signal loss occurring in the system.

In some embodiments, optical interrogation system 132 may gather information about formation 102 by interrogating voltage sensor 128 with any suitable fiber optic strain measurement methods, including but not limited to interferometric, fiber Bragg grating, fiber laser strain sensing, and intrinsic and extrinsic Fabry-Perot interferometric methods. For example, the electro-optical transducer in voltage sensor 128 may be made of an electrostrictive material that changes shape in response to an electric potential applied to voltage sensor 128. Optical interrogation system 132 may produce a light signal with a light source (e.g., light emitting diode (LED)) on to fiber optic cable 130. The change in shape of voltage sensor 128 may affect the light on fiber optic cable 130 such that optical interrogation system 132 may detect amplitude, frequency, and/or phase changes in the light on fiber optic cable 130. These changes to the light on fiber optic cable 130 may be indicative of the electric properties at electrode 126 as measured by voltage sensor 128. In other embodiments, the electro-optical transducer of voltage sensor 128 may be an LED that converts electrical potential into light. The light may be transmitted to optical interrogation system 132 via fiber optic cable 130. The intensity of the light may be proportional to an electric potential applied to voltage sensor 128. Accordingly, optical interrogation system 132 may be configured to measure the strength, gradient, and/or time derivative for electrical fields at voltage sensor 128, providing insight into properties of and changes to formation 102.

Optical interrogation system 132 may include a computer (not expressly shown) that acts as a data acquisition system and/or data processing system to analyze measurements from voltage sensors 128. The computer may also control production parameters to optimize production of fluids based on measurements from voltage sensors 128 and/or information derived from these measurements. Production parameters may include for example, the flow rate and pressure permitted from selected production zones, flow rate and pressure in selected injection zones, and the composition of the injection fluid, each of which may be controlled via computer controlled valves and pumps.

Generally, the computer in optical interrogation system 132 may include a central processing unit, memory, and a display. The well operator and/or engineers may interact with the computer through a user interface on the display and input devices such as keyboards, pointer devices, and touchscreens, and via output devices such as printers, monitors, and touchscreens. Software running on the computer may reside in the memory and/or on non-transient information storage media coupled to the computer. The computer may be implemented in different forms including, for example, an embedded computer permanently installed as part of optical interrogation system 132, a portable computer coupled to optical interrogation system 132, a remote desktop computer coupled to optical interrogation system 132 via a wireless and/or wired computer network, a mobile device, or any electronic device having a programmable processor and an interface for input and output.

Formation 102 may contain fluids, such as oil, gas, and water, dispersed among porous formations, such as sandstone and/or shale. During production, it may be beneficial to monitor, among other things, fluid saturations in formation 102 in order to allow well operators and engineers to make decisions relating to reservoir management, production enhancement, and/or intelligent completions of the well. Fluid displacements or a lack thereof may represent bypassed hydrocarbons or water flooding (e.g., as discussed in further detail in FIG. 5), and thus may be useful to effectively and efficiently produce from wellbore 114. Use of formation monitoring system 120, including one or more voltage sensors 128 placed along various points inside casing string 110 to measure voltage or other properties of formation 102 along various points of casing string 110, may allow monitoring of formation 102 without interrupting operation (e.g., production, injection, and monitoring) of wellbore 114. Furthermore, formation monitoring system 120 may be used to, among other things, supplement reservoir management workflows so as to optimize production and injection practices, and advise intervention strategies and practices in advance of unfavorable or unexpected production scenarios.

During operation of formation monitoring system 120, power source 122 may inject a pulse of current into casing string 110. In some embodiments, the pulse may be low frequency in order to maximize penetration through casing string 110 into formation 102. In one embodiment, the current waveform from power source 122 may be sinusoidal with a frequency between approximately 0.01 Hertz (Hz) and 100 Hz. Additionally, the current waveform may be a regular periodic bipolar square waveform with a fifty percent (50%) duty cycle and base frequency between approximately 0.01 Hz and approximately 100 Hz. The frequency and amplitude of the current supplied by power source 122 may be selected so as not to interfere with anti-corrosion processes already or intended to be applied to casing string 110.

Because casing string 110 is an electrically conductive material (e.g., steel and steel alloys), it may serve as a source electrode for current flow into formation 102 surrounding wellbore 114. Accordingly, as the injected current flows along casing string 110, the current disperses into formation 102. The magnitude and distribution of the current flow into formation 102 may vary according to the voltage at power source 122 and the electrical properties (e.g., resistivity) of formation 102.

In some embodiments, current from power source 122 may be targeted to specific regions of formation 102. For example, casing string 110 may be electrically insulated in certain locations in order to target specific locations for current leakage into formation 102. For example, insulation may be added at non-producing zones, where formation monitoring may not be desired. Limiting the leakage current into formation 102 at non-producing zones may result in higher leakage current at producing zones, or other zones of interest along wellbore 114. Yet another way to target current to a particular region of formation 102 may be to locate the connection between power source 122 and casing string 110 in close proximity to the target region of formation 102. Improving the leakage current at zones of interest along wellbore 114 may allow for higher accuracy in the measurements performed by formation monitoring system 120.

The amount of leakage current flowing into formation 102 may be indicative of the resistivity of the formation 102 surrounding wellbore 114. For example, the higher the resistivity of formation 102, the less current applied to casing string 110 will leak into formation 102. By contrast, the lower the resistivity of formation 102, the more current applied to casing string 110 will leak into formation 102. Voltage sensors 128 may detect the amount of leakage current flowing into formation 102 by measuring EM properties at different locations along casing string 110. For example, an electric potential may occur at casing string 110 as a result from current leaking into formation 102 and the resistivity of formation 102. Thus, formation monitoring system 120 may ascertain EM properties (e.g., the resistivity of formation 102) surrounding wellbore 114 by monitoring the measurements of the various voltage sensors 128 along wellbore 114. EM properties of formation 102 may provide insight as to the structure, fluid saturation, porosity, and/or permeability of formation 102.

Adding the ability to process and store measurements from voltage sensor 128 over time, may enable the derivation of additional information about formation 102. Beyond static data from one-time measurements, quasi-static data and dynamic data may also be compiled relating to formation 102. Such information may inform the well operator of changes in the structure, resistivity, fluid substitution (e.g., injected water replacing oil or gas in the formation), fluid saturation, porosity, and/or permeability of formation 102 as these changes occur over time. For example, changes in EM measurements over time may indicate the occurrence of fluid substitution in the formation, such as water flooding discussed in FIG. 5. Any and all of the information collected and/or generated by formation monitoring system 120 may be used for reservoir management, production enhancement, and/or controlling intelligent well completions.

Figure 2A:
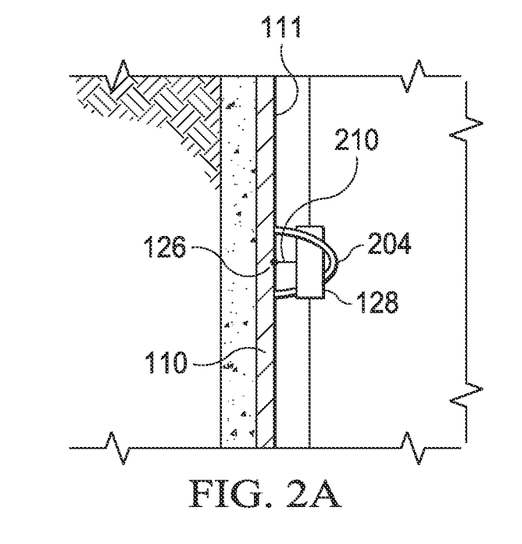
FIG. 2A illustrates an elevation view of a voltage sensor coupled to the inside surface of a casing string.

Deployment of voltage sensors 128 and fiber optic cable 130 within casing string 110 may be accomplished in various ways. In some embodiments, voltage sensor 128 and fiber optic cable 130 may be coupled to casing string 110 during manufacturing of casing string 110, during preparation of casing string 110 for permanent deployment into wellbore 114, and/or with the use of downhole tools after casing string 110 is deployed within wellbore 114. FIG. 2A illustrates an elevation view of a voltage sensor coupled to the inside surface of a casing string. In some embodiments, voltage sensor 128 may be coupled to fiber optic cable 130. Therefore, holding voltage sensor 128 in place may also hold fiber optic cable 130 in place, and vice versa. Accordingly, clamp 204 may be placed around voltage sensor 128, fiber optic cable 130, or both in order to hold voltage sensor 128 and fiber optic cable 130 in place within casing string 110. In some embodiments, multiple clamps 204 may be used to secure voltage sensor 128 and fiber optic cable 130 independently. Further, voltage sensor 128 and fiber optic cable 130 may be secured to casing string 110 by any other suitable manner, including but not limited to adhesive, hooks, straps, bands, or magnets.

Figure 2B:
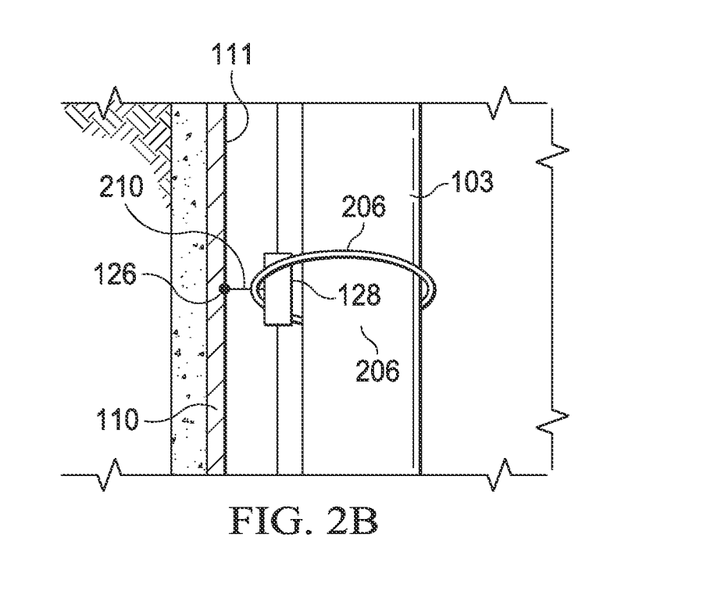
FIG. 2B illustrates an elevation view of a voltage sensor coupled to a production tubing.

In some embodiments, voltage sensors 128 and fiber optic cable 130 may be deployed into casing string 110 with production tubing 103. For example, in FIG. 2B illustrates an elevation view of a voltage sensor coupled to a production tubing. Voltage sensor 128 and fiber optic cable 130 may be coupled to production tubing 103 by clamp 206 holding voltage sensor 128 in place. Through its coupling to voltage sensor 128, fiber optic cable 130 may also be held in place by clamp 206. In some embodiments, clamp 206 may secure fiber optic 130 to production tubing 103 and voltage sensor 128 may be held in place by way its coupling fiber optic cable 130. Further, in some embodiments, more than one clamp 206 may be used to secure voltage sensor 128 and fiber optic cable 130 separately to production tubing 103. Although clamp 206 is expressly shown, any other method for securing voltage sensor 128 and fiber optic cable 130 to casing string 110 may be used, including but not limited to adhesive, hooks, straps, bands, or magnets. By their coupling to production tubing 103, voltage sensor 128 and fiber optic cable 130 may be deployed within casing string 110 as production tubing 103 is inserted into casing string 110.

As also shown in FIGS. 2A and 2B, voltage sensor 128 may be electrically coupled to casing string 110 in order to make measurements of electrical properties at casing string 110. In some embodiments, voltage sensor 128 may electrically couple to casing string 110 via electrode 126. Electrode 126 may be comprised of electrically conducting material, including but not limited to, silver, copper, gold, aluminum, nickel, zinc, or brass. When placed into contact with inner surface 111 of casing string 110, electrode 126 may conduct the electrical properties existing at casing string 110 to voltage sensor 128. Voltage sensor 128 may be electrically coupled to electrode 126 by any suitable manner, including for example, wire 210. Wire 210 may be composed of electrically conducting material, and may also be insulated to reduce noise within the wellbore. In some embodiments, voltage sensor 128 and electrode 126 may be manufactured as a single unit. In some embodiments, voltage sensor 128 may be electrically coupled to more than one electrode 126.

Figure 3A:
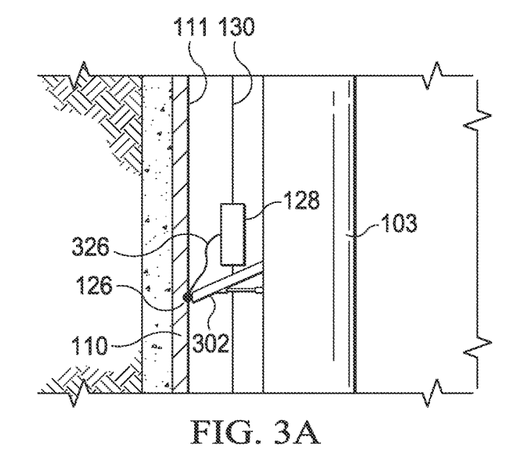
FIGS. 3A, 3B, and 3C illustrate elevation views of various techniques for placing electrodes in contact with a casing string.
Figure 3B:
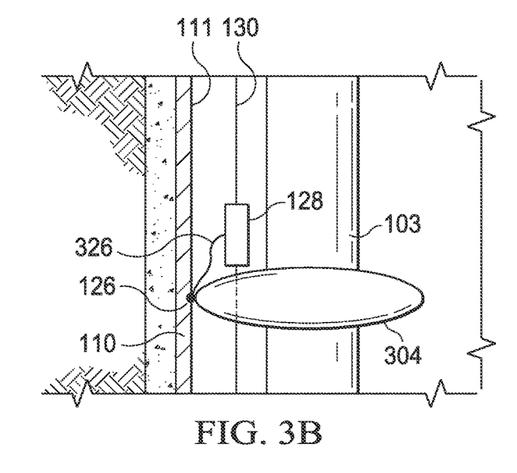
Figure 3C:
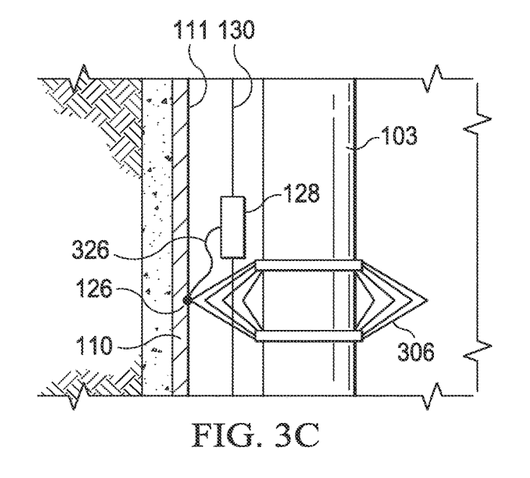

As discussed above, when deploying voltage sensors 128 by way of production tubing 103, an electrical connection may be made from voltage sensor 128 to casing string 110 via electrode 126. FIGS. 3A, 3B, and 3C illustrate elevation views of various techniques for placing electrodes in contact with a casing string. For example, in FIG. 3A, electrode 126 may be held in contact with inner surface 111 of casing string 110 by deployable arm 302. Deployable arm 302 may use a spring, hydraulic mechanism, and/or any other method to apply outward pressure from production tubing 103 in order to hold electrode 126 in contact with inner surface 111 of casing string 110. In FIG. 3B, electrode 126 may be mounted to swellable packer 304, which may be coupled to production tubing 103. When exposed to downhole conditions, swellable packer 304 may expand or swell, pressing electrode 126 into contact with inner surface 111 of casing string 110. As illustrated in FIG. 3C, a bow-spring 306 may also operate to press electrode 126 in contact with inner surface 111 of casing string 110. In FIGS. 3A-3C, wire 326 may electrically couple voltage sensor 128 to electrode 126, so that voltage sensor 128 may measure the electric properties of casing string 110 and communicate such measurements to optical interrogation system 132 via fiber optic cable 130.

To minimize difficulties associated with deploying voltage sensor 128 and fiber optic cable 130 via production tubing 103, a restraining mechanism (not expressly shown) may hold the devices described in FIGS. 3A-3C against production tubing 103 while production tubing 103 is inserted into casing string 110. Thereafter, exposure to downhole conditions or a circulated fluid, like an acid for example, may degrade the restraining mechanism and enable the deploying device to extend voltage sensor 128 and/or electrode 126 against inner surface 111 of casing string 110. A separately powered mechanism, like hydraulics, may also be activated to extend voltage sensor 128 and/or electrode 126 against inner surface 111 of casing string 110 after production tubing 103 has been deployed within wellbore 114.

The methods and devices described in FIGS. 3A-3C are merely illustrative and not intended to be limiting on the scope of the disclosure. Other extension mechanisms (e.g., balloons, projectiles) are known in the field and may be suitable for placing voltage sensor 128 in electrical contact with casing string 110. In some embodiments, voltage sensor 128 may itself be placed in direct contact with inner surface 111 of casing string 110 by any of the methods and devices described in FIGS. 3A-3C. In such embodiments, the use of connecting wire 326 may not be necessary to establish an electrical connection between voltage sensor 128 and casing string 110 as any electrical properties on casing string 110 may be experienced by voltage sensor 128 directly.

Deploying devices via production tubing 103 may allow for an array of voltage sensors 128 to be placed within wellbore 114 during the deployment of production tubing 103. One advantage of this deployment method may be easier access for repairing and/or replacing monitoring equipment. For example, access to voltage sensors 128 and fiber optic cable 130 may be achieved by extracting production tubing 103 from the wellbore 114. Another advantage of deployment by production tubing 103 is that the array of voltage sensors 128 may be deployed in existing wells without costly well intervention. Utilizing an array of voltage sensors 128 may ensure redundancy of the formation monitoring system should one or more of the sensors stop working. Additionally, multiple voltage sensors 128 may be placed at different locations along casing string 110 so that a higher granularity of information is available for formation 102.

Figure 4:
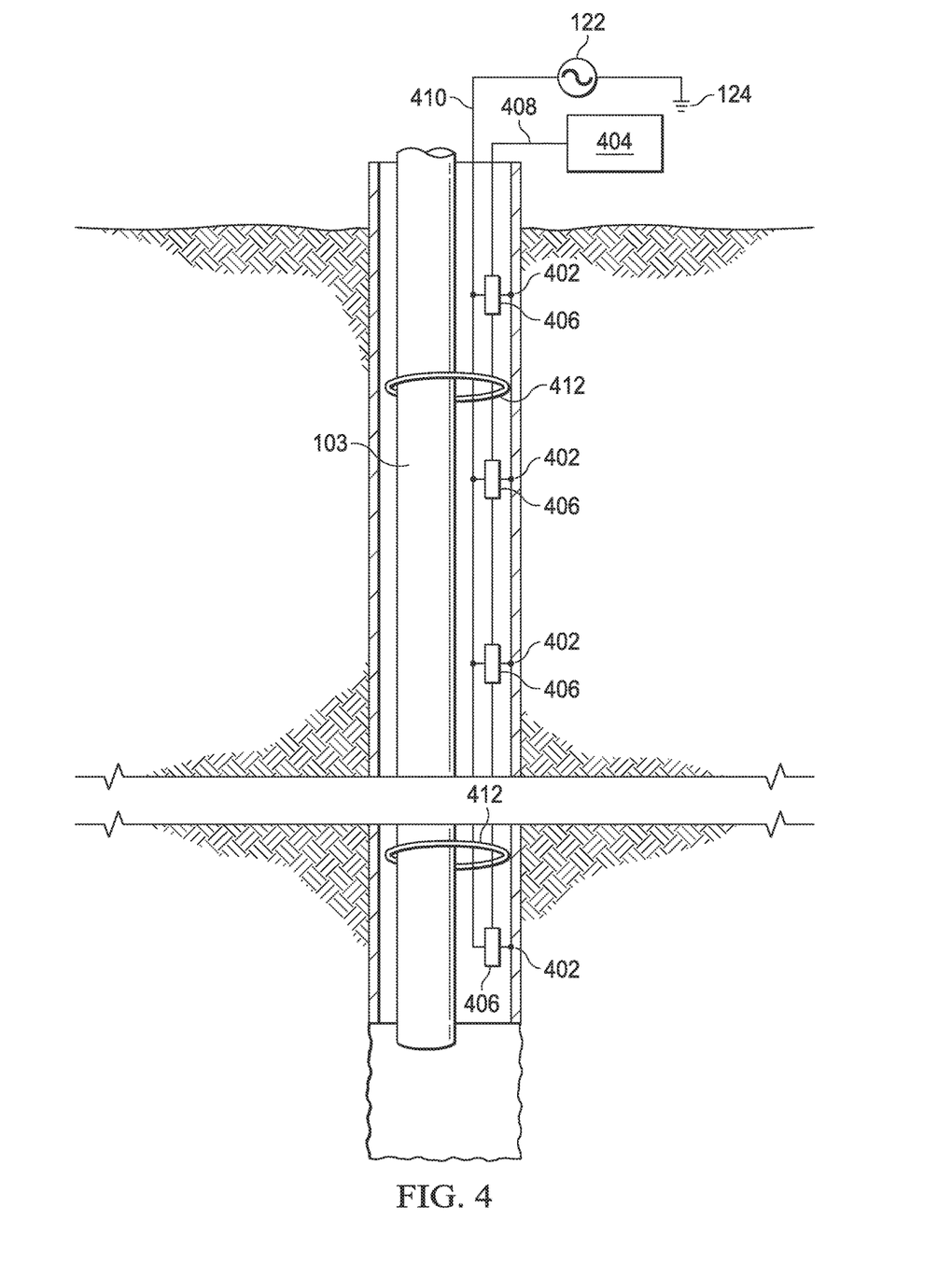
FIG. 4 illustrates an elevation view of a downhole electromagnetic formation monitoring system with multiple excitation points deployed within the casing string of a wellbore.

To concentrate current in particular areas of interest, it may be desirable to have multiple current injection points along casing string 110. FIG. 4 illustrates an elevation view of a formation monitoring system with multiple current injection points deployed within casing string 110. Electrodes 402 may be placed in contact with inner surface 111 of casing string 110. Multiplex controller 404 may control switches 406, determining which of electrodes 402 receive current (e.g., an electrical excitation) from power source 122. Wire 408 may couple control switches 406 to multiplex controller 404. Wire 410 may electrically couple electrode 402 to power source 122 when switch 406 is activated. Switch 406, wire 408, and wire 410 may be secured to production tubing 103 by clamps 412 for deployment via production tubing 103. Electrode 402 may be made from an electrically conductive material, and may take a shape that maximizes contact area with inner surface 111 of casing string 110. In some embodiments, control switches 406 and electrodes 402 may be manufactured as a single element.

Deployment of electrodes 402 and switches 406 at current injection points may be done in any of the ways disclosed above with respect to FIGS. 2A and 2B in the context of voltage sensor 128 and electrode 126. Further, electrode 402 and switches 406 may be coupled to casing string 110 during manufacturing of casing string 110, during preparation of casing string 110 for permanent deployment in wellbore 114, and/or with the use of downhole tools after casing string 110 is deployed within wellbore 114. Electrodes 402 and switches 406 may also be deployed via production tubing 103. In such embodiments, any of the extension mechanisms disclosed above with respect to FIGS. 3A-3C for voltage sensor 128 and electrode 126 may also be used to place electrodes 402 and/or switches 406 in contact with inner surface 111 of casing string 110.

Placement of electrodes 402 along casing string 110 may be chosen for a specific purpose based on prior analysis. For example, frequency of the current, depth of the investigation, target region of the formation, and/or the size of the array of voltage sensors 128 may be considered in determining where to place electrodes 402. In some embodiments, electrode 402 may be placed between and/or near electrodes 126 coupled to voltage sensor 128. Such a placement may allow for a higher accuracy for measurements made by voltage sensor 128 as the current injection point from power source 122 may be directly targeted to the particular region of interest.

Multiplex controller 404 may provide control for switches 406 and may determine which of electrodes 402 receive current from power source 122. For example, multiplex controller 404 may sequentially excite electrodes 402 with current, excite all electrodes 402 at the same time, and/or prevent the excitation of all electrodes 402, effectively isolating power source 122 from casing string 110.

Figure 5:
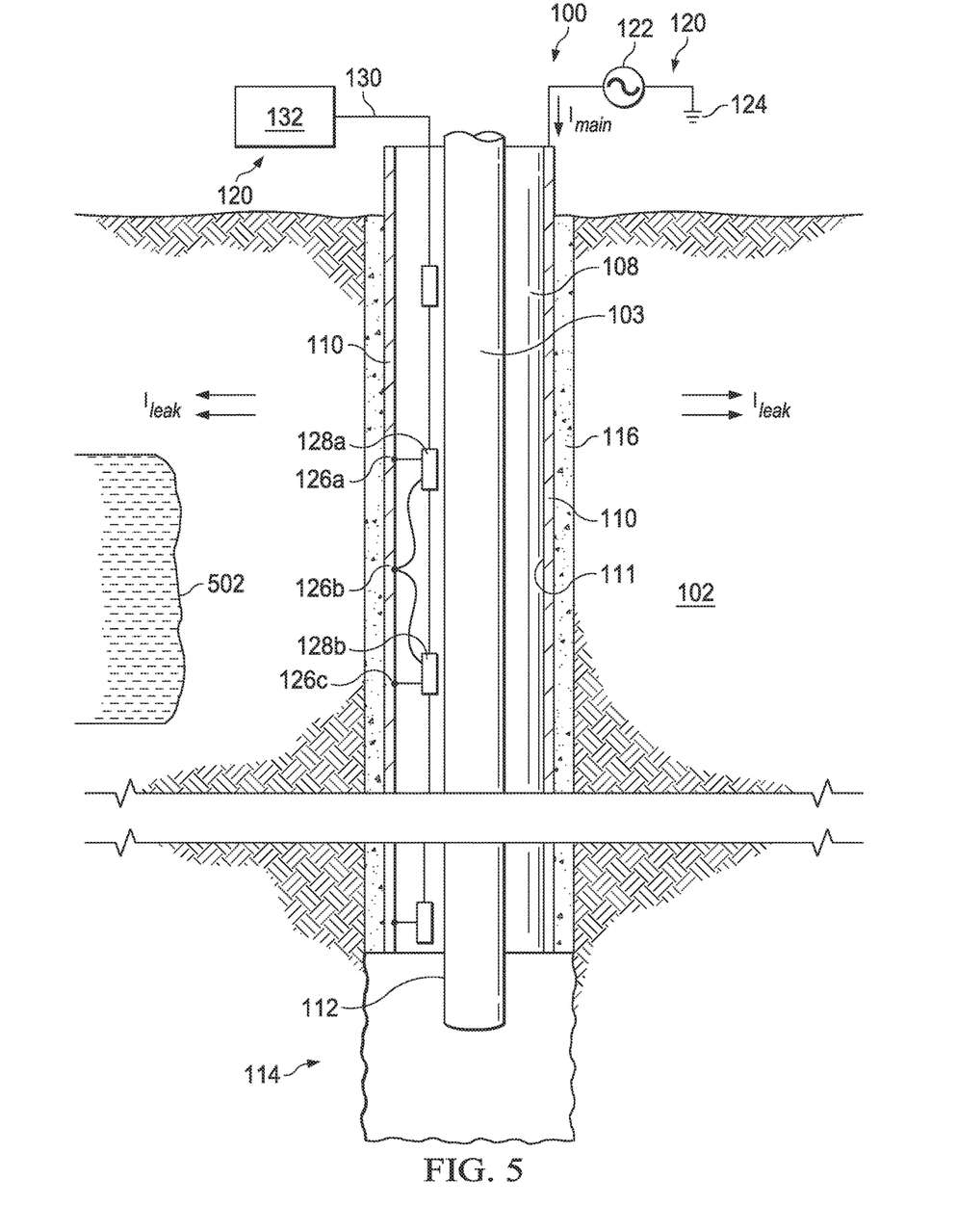
FIG. 5 illustrates an elevation view of a downhole electromagnetic formation monitoring system as applied to the detection of water flooding.

FIG. 5 illustrates an elevation view of a downhole electromagnetic formation monitoring system as applied to the detection of water flooding. Voltage sensors 128a and 128b may be deployed within casing string 110 via production tubing 103 in accordance with this disclosure. Electrodes 126a, 126b, and 126c may be electrically coupled to inner surface 111 of casing string 110. Power source 122 may be electrically coupled to casing string 110 at well surface or well site 106, providing a current $I_{main}$ to casing string 110. As current $I_{main}$ flows down casing string 110 from well surface or well site 106, some of the current, $I_{leak}$, may dissipate into formation 102. The amount of leakage current $I_{leak}$ dissipating into formation 102 may depend on the resistivity of formation 102 at the various points along wellbore 114.

At time $T_0$, optical interrogation system 132 may interrogate voltage sensors 128a and 128b to determine the electric potential across electrodes 126a, 126b, and 126c. Specifically, voltage sensor 128a may measure voltage $V_{ab}$ between electrodes 126a and 126b, and voltage sensor 128b may measure voltage $V_{bc}$ between electrodes 126b and 126c. The voltages $V_{ab}$ and $V_{bc}$ may be applied to the transducers within voltage sensors 128a and 128b respectively. Voltage measurements $V_{ab}$ and $V_{bc}$ from voltage sensors 128a and 128b respectively may be communicated to optical interrogation system 132 via fiber optic cable 130. Optical interrogation system 132 may store or process these measurements with the computer and/or communicate the measurements to a separate system (e.g., a system controlling well production).

Optical interrogation system 132 may process the voltage measurements from voltage sensors 128 by calculating the second difference of the electric potential. For example, the voltage from voltage sensor 128b (e.g., $V_{bc}$, the voltage between 126b and 126c) may be subtracted from the voltage from voltage sensor 128a (e.g., $V_{ab}$ the voltage between 126a and 126b). The second difference of the voltage may be proportional to leakage current $I_{leak}$ radially flowing into formation 102 near electrodes 126a, 126b, and 126c. From these calculations, a resistivity profile may be determined for the region of formation 102 located near electrodes 126a, 126b, and 126c. The resistivity profile may represent measurements as taken at time $T_0$.

At a later time $T_1$, optical interrogation system 132 may again interrogate voltage sensors 128a and 128b to determine the electric potential across electrodes 126a, 126b, and 126c. Measurements from voltage sensors 128a and 128b may be communicated to optical interrogation system 132 via fiber optic cable 130. Optical interrogation system 132 may store or process these measurements with the computer and/or communicate the measurements to a separate system.

By comparing the measurements at times $T_0$ and $T_1$, optical interrogation system 132 may detect changes in formation 102 surrounding wellbore 114 occurring over time. Changes in formation 102 may occur for a variety of reasons, including but not limited to, water flooding. Water flooding is the injection of water into a reservoir to stimulate production from the reservoir. Water flood 502 may not be present in formation 102 at time $T_0$, but may be the result of production operations occurring between time $T_0$ and $T_1$. Increased water saturation of formation 102 may cause the resistivity of formation 102 to decrease. Therefore, at time $T_1$, the resistivity of the formation may be lower, which may result in an increase of current $I_{leak}$ dissipating into formation 102 near the saturated region located in proximity to electrodes 126a, 126b, and 126c. The second difference of electric potential (e.g., voltage) at time $T_1$ may therefore be higher than that calculated at time $T_0$. The increase of the second difference of the voltage measurements may thus serve as an indication to the well operator that water flooding has reached close proximity to wellbore 114, and specifically the region of formation 102 located near electrodes 126a, 126b, and 126c. Thus, measurements from the various voltage sensors 128 may help determine the magnitude and location of various changes in formation 102.

Although described with respect to water flooding, the techniques in FIG. 5 may be used to detect any other changes in formation 102. For example, monitoring formation 102 over time may help realize bypassed oil and the depletion of certain materials from the formation and nearby reservoirs. Formation monitoring may also advise production parameters, including but not limited to flow rate/pressure permitted from selected production zones, flow rate/pressure in selected injection zones, and the composition of the injection fluid. Likewise, formation monitoring data may also determine better completion and perforation policies, and may further enable optimization of hydrocarbon production by enabling the well operator to track flows associated with each perforation and accordingly selectively block fluid influxes.

The formation monitoring data acquired by this disclosure may also be integrated with other available geophysical data, like seismic or gravity data, to improve the resolution of a reservoir model using methods of cooperative or joint modeling, inversion, or imaging. Additionally, the formation monitoring data may be integrated with production data, including for example, volumetrics or chemical tracing, to improve the resolution of a reservoir model using methods of cooperative or joint modeling, inversion, or imaging. To integrate data across multiple systems, the formation monitoring system described herein may provide an application programmable interface (API) for interfacing and communicating data with other systems or software. In some embodiments, the disclosed formation monitoring system may be packaged as part of an integrated earth modeling software package, like Halliburton Company's DecisionSpace® Production.

Downhole formation monitoring systems and methods incorporating teachings of the present disclosure may be satisfactorily used with wells located on offshore platforms, drill ships, semi-submersibles and drilling barges (not expressly shown). Moreover, the teachings of the present disclosure may be deployed in vertical, high angle, or horizontal wells. Moreover, the teachings of the present disclosure may be applied in the production of any subsurface minerals, including but not limited to oil, gas, water, carbon dioxide, and ground water.

Embodiments disclosed herein include:

A. A through-casing formation monitoring system including a casing string positioned within a wellbore, a power source electrically coupled to the casing string, a voltage sensor electrically coupled to an inner surface of the casing string such that the voltage sensor allows a continued operation of the wellbore, a fiber optic cable coupled to an electro-optical transducer within the voltage sensor, and an optical interrogation system configured to measure an electric potential applied to the electro-optical transducer via the fiber optic cable.

B. A method of monitoring a formation including electrically connecting a voltage sensor to an inner surface of a casing string positioned within a wellbore such that the voltage sensor allows a continued operation of the wellbore, injecting an electric current from a power source into the casing string, measuring an electric potential applied to an electro-optical transducer within the voltage sensor, and receiving a measurement of the electric potential from the voltage sensor at an optical interrogation system via a fiber optic cable C. A sensor device including a first electrode and a second electrode electrically coupled to an inner surface of a casing string within a wellbore, and an electro-optical transducer electrically coupled to the first electrode and the second electrode.

Each of the embodiments A and B may have one or more of the following additional elements in any combination: Element 1: wherein the power source is electrically coupled to the casing string through a first electrode and a second electrode. Element 2: a multiplex controller configured to select at least one of the first electrode and the second electrode to receive current from the power source. Element 3: wherein the multiplex controller is further configured to select the first electrode and the second electrode to receive the current in sequential order. Element 4: wherein the multiplex controller is further configured to select the first electrode and the second electrode to receive the current at the same time. Element 5: wherein the first electrode and the second electrode are coupled to a production tubing positioned within the casing string. Element 6: wherein the voltage sensor is coupled to a production tubing positioned within the casing string. Element 7: wherein the optical interrogation system is further configured to calculate a parameter of a formation near the wellbore based on the electric potential applied to the electro-optical transducer. Element 8: wherein the optical interrogation system is further configured to calculate a parameter of a formation near the wellbore based on the electric potential applied to the electro-optical transducer.

Embodiment C may have one or more of the following additional elements in any combination: Element 1: wherein the electro-optical transducer is communicatively coupled to an optical interrogation system via a fiber optic cable. Element 2: wherein the electro-optical transducer is configured to change shape in response to an electric potential between the first electrode and the second electrode. Element 3: wherein the electro-optical transducer is configured to produce a light signal in response to an electric potential between the first electrode and the second electrode. Element 4: wherein the electro-optical transducer is coupled to a production tubing positioned within the casing string. Element 5: wherein the first electrode and the second electrode are placed into electrical contact with the inner surface of the casing string by a deployable arm. Element 6: wherein the first electrode and the second electrode are placed into electrical contact with the inner surface of the casing string by a swellable packer. Element 7: wherein the first electrode and the second electrode are placed into electrical contact with the inner surface of a casing string by a bow-spring.

Although the present disclosure and its advantages have been described in detail, it should be understood that various changes, substitutions and alterations can be made herein without departing from the spirit and scope of the disclosure as defined by the following claims. For example, while the embodiment discussed describes deploying the voltage sensors via the production tubing, the voltage sensors may be placed within the casing string in any manner that allows the voltage sensors to make EM measurements through the casing string while not interfering with production from the wellbore.

What is claimed is:

1. A through-casing formation monitoring system, comprising:
   a casing string positioned within a wellbore;
   a power source electrically coupled to the casing string;
   a voltage sensor electrically coupled to an inner surface of the casing string such that the voltage sensor allows a continued operation of the wellbore;
   a fiber optic cable coupled to an electro-optical transducer within the voltage sensor; and
   an optical interrogation system configured to measure an electric potential applied to the electro-optical transducer via the fiber optic cable.

2. The system of claim 1, wherein the power source is electrically coupled to the casing string through a first electrode and a second electrode.

3. The system of claim 2, further comprising a multiplex controller configured to select at least one of the first electrode and the second electrode to receive current from the power source.

4. The system of claim 3, wherein the multiplex controller is further configured to select the first electrode and the second electrode to receive the current in sequential order.

5. The system of claim 3, wherein the multiplex controller is further configured to select the first electrode and the second electrode to receive the current at the same time.

6. The system of claim 2, wherein the first electrode and the second electrode are coupled to a production tubing positioned within the casing string.

7. The system of claim 2, wherein the first electrode and the second electrode are placed into electrical contact with the inner surface of the casing string by a deployable arm.

8. The system of claim 2, wherein the first electrode and the second electrode are placed into electrical contact with the inner surface of the casing string by a swellable packer.

9. The system of claim 2, wherein the first electrode and the second electrode are placed into electrical contact with the inner surface of a casing string by a bow-spring.

10. The system of claim 1, wherein the voltage sensor is coupled to a production tubing positioned within the casing string.

11. The system of claim 1, wherein the optical interrogation system is further configured to calculate a parameter of a formation near the wellbore based on the electric potential applied to the electro-optical transducer.

12. The system of claim 11, wherein the parameter is a resistivity of the formation, a change in resistivity of the formation over time, an approximate location of the change in resistivity of the formation, and a fluid saturation of the formation.

13. A method of monitoring a formation, comprising:
electrically connecting a voltage sensor to an inner surface of a casing string positioned within a wellbore such that the voltage sensor allows a continued operation of the wellbore;
injecting an electric current from a power source into the casing string;
measuring an electric potential applied to an electro-optical transducer within the voltage sensor; and
receiving a measurement of the electric potential from the voltage sensor at an optical interrogation system via a fiber optic cable.

14. The method of claim 13, wherein the power source is electrically coupled to the casing string through a first electrode and a second electrode.

15. The method of claim 14, wherein the electric current from the power source is injected to at least one of the first electrode and the second electrode.

16. The method of claim 15, wherein the electric current from the power source is injected to the first electrode and the second electrode in sequential order.

17. The method of claim 15, wherein the electric current from the power source is injected to the first electrode and the second electrode at the same time.

18. The method of claim 14, wherein the first electrode and the second electrode are coupled to a production tubing positioned within the casing string.

19. The method of claim 14, wherein the first electrode and the second electrode are placed into electrical contact with the inner surface of the casing string by a deployable arm.

20. The method of claim 14, wherein the first electrode and the second electrode are placed into electrical contact with the inner surface of the casing string by a swellable packer.

21. The method of claim 14, wherein the first electrode and the second electrode are placed into electrical contact with the inner surface of a casing string by a bow-spring.

22. The method of claim 13, wherein the voltage sensor is coupled to a production tubing positioned within the casing string.

23. The method of claim 13, further comprising calculating a parameter of a formation near the wellbore based on the measurement of the electric potential from the voltage sensor.

24. The method of claim 23, wherein the parameter is a resistivity of the formation, a change in resistivity of the formation over time, an approximate location of the change in resistivity of the formation, and a fluid saturation of the formation.

* * * * *